United States Patent [19]

Roeder

[11] Patent Number: 4,513,428
[45] Date of Patent: Apr. 23, 1985

[54] SIMULTANEOUS DETECTION OF TIME COINCIDENT SIGNALS IN AN ADAPTIVE DOPPLER TRACKER

[75] Inventor: Allan W. Roeder, Whitesboro, N.Y.

[73] Assignee: The United States of America as represented by the Secretary of the Air Force, Washington, D.C.

[21] Appl. No.: 329,557

[22] Filed: Dec. 3, 1981

[51] Int. Cl.³ .............................................. H03D 13/00
[52] U.S. Cl. .................................. 375/120; 343/7 PL; 375/77
[58] Field of Search .............. 375/81, 83, 94, 99, 375/97, 120; 343/5 DP, 7 PL; 329/50, 136

[56] References Cited

U.S. PATENT DOCUMENTS

| 4,079,329 | 3/1978 | England et al. | 329/50 |
| 4,135,057 | 1/1979 | Bayless, Sr. et al. | 178/67 |
| 4,243,941 | 1/1981 | Zdunek | 329/50 |

Primary Examiner—Robert L. Griffin
Assistant Examiner—Raymond C. Glenny
Attorney, Agent, or Firm—Donald J. Singer; Willard R. Matthews

[57] ABSTRACT

The performance of an adaptive digital doppler tracker having a sample data phase locked loop is improved by a circuit that detects and demodulates interfering signals. The tracker has a coherence sensor that provides signals indicating coherence and non-coherence conditions. An amplitude sensor generates a strong signal when interfering (time coincident) signals are received. The tracker includes both a coherent data detector and an SSB processor. An interference detector receives the outputs of the coherence sensor and the amplitude sensor and generates an SSB enable signal in response to the coincidence of a strong signal and a non-coherent condition signal. The SSB enable signal disables the coherent data detector and enables the SSB processor which detects both interfering signals.

14 Claims, 7 Drawing Figures

SIMULTANEOUS DETECTION OF TIME COINCIDENT SIGNALS IN AN ADAPTIVE DOPPLER TRACKER

STATEMENT OF GOVERNMENT INTEREST

The invention described herein may be manufactured and used by or for the Government for governmental purposes without the payment of any royalty thereon.

BACKGROUND OF THE INVENTION

This invention generally relates to communication systems which require coherent detection of pulse or pulse compressed signals and in particular to an adaptive doppler tracker for use in such systems that provides simultaneous detection of interference signals.

Communications systems such as the proposed USAF SEEK TALK system employ coherent doppler trackers for base line systems. The use of this type of circuit is particularly advantageous in that: (a) there is no doppler tracking loss during data detection even at highest doppler rates; (b) coherent detection is optimum which is particularly important since the modem must operate at low signal-to noise ratios; (c) once a coherent reference is established it is relatively easy to generate a coherent signal for the array and (d) a frequency indicator is provided which is useful for identifying the same signal in adjacent range bins.

Coherent doppler trackers can be implemented in either analog or digital form. Breakthroughs in analog/-digital converter technology, large scale integration of digital circuitry and the operational stability of digital processing make digital implementation attractive.

A standard technique for coherent data detection in systems of this type is the Costas receiver. This receiver uses a synchronous detector and a phase locked oscillator to provide a coherent reference for the received signal. This type of receiver, however, operates with rectangular coordinate X,Y pulse components and consequently requires complex signal processing. It does not measure coherence between an estimated phase and the input signal phase and it utilizes a constant bandwidth through all modes of operation.

The foregoing difficiencies are largely overcome by the adaptive doppler tracker disclosed in copending U.S. patent application Ser. No. 329,558 of Allen W. Roeder entitled *Sample Data Phase Locked Loop For Adaptive Doppler Trackers* filed on even date herewith and incorporated herein by reference. However, in addition to the limitations noted, an additional problem is frequently encountered. That is the problem of processing interfering or simultaneously arriving signals. The present invention is directed toward solving this problem by adding on to the adaptive doppler tracker disclosed in the above referenced patent application, additional circuitry that detects the interference condition and provides for demodulation of both interfering signals with a single side band (SSB) processor.

SUMMARY OF THE INVENTION

The invention is directed to a pulse interference sensor and single side band (SSB) demodulator for use in voice or analog data transmission systems having modulated repetitive pulses and coherent pulse detection. Multiple time coincident signals can be simultaneoulsy demodulated to provide an output that is the linear sum of the two data modulations. In-phase and quadrature rectangular coordinate inputs are analog to digital (A/D) converted and then converted, from rectangular to polar coordinates. A phase estimate is subtracted from the input to obtain a phase error which is applied to phase estimate and frequency estimate loops, a coherence estimate sensor, and a data detector. To provide for interference demodulation, amplitude tracking, interference detection, and SSB processing functions are employed. The amplitude tracker provides a smooth estimate of one of the signal input amplitudes. A strong signal output from the tracker, coupled with little or no coherence indication from the coherence estimate sensor, indicates an interference condition which is detected by the interference detector. An enable signal is generated which then disables coherent detection and enables SSB detection. The SSB processor translates the polar coordinates back to rectangular coordinates, and then recursively filters the rectangular coordinate samples to attenuate the lower side band data. The ouput of the SSB processor is the linear combination of the upper side band modulation of the two interfering signals, with a small percentage of lower side band power.

It is a principal object of the invention to provide a new and improved digital adaptive doppler tracker.

It is another object of the invention to provide a digital adaptive doppler tracker that is capable of simultaneous detection of time coincident signals.

These together with other objects, features and advantages of the invention will become more readily apparent from the following detailed description when taken in conjunction with the illustrative embodiment in the accompanying drawings.

DETAILED DESCRIPTION OF THE PREFERRED EMBODIMENT

The invention relates to the transmission of sampled voice or analog signals. It is applicable to systems using linear modulation of a repetitive pulse (compressed pulse or spread spectrum) to send the data.

In voice or analog data transmission systems using modulated repetitive pulses and coherent pulse detection, multiple signals can be simultaneously demodulated provided that the periodic pulses are displaced in time or phase. When the signals are time coincident, the signals interfere and normally prevent detection. The object of this invention is to detect the presence of such an interference condition, and to provide for simultaneous detection of both signals. The output data is the linear sum of the two data modulations.

Figure 1:
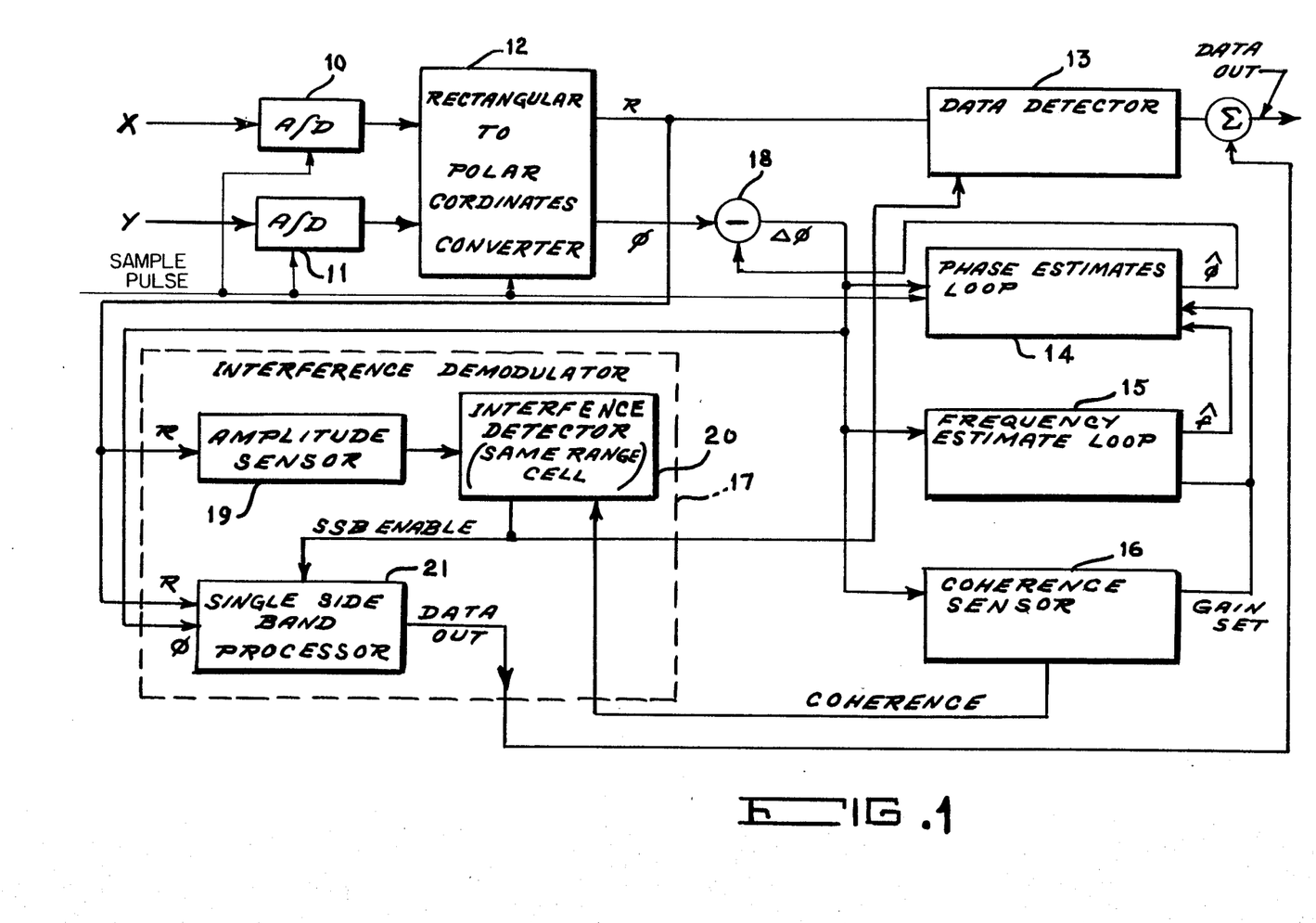
FIG. 1 is a simplified block diagram of an adaptive doppler tracker incorporating the interference detection circuits of the invention.

Referring to FIG. 1 there is illustrated thereby a simplified block diagram of the coherent sample data phase lock demodulators (adaptive doppler tracker of the co-pending patent application referenced above) together with the single sideband interference detector of the invention. The adaptive doppler tracker consists of analog to digital converters 10, 11, rectangular (X,P) to polar (R,θ) coordinate converter 12, coherent data detector 13, phase estimate loop 14, frequency estimate loop 15 and coherence sensor 16. To provide for interference demodulation, three additional functions are required. These are indicated by the functions within the dotted lines (designated interference demodulator 17) in FIG. 1. The functions are: Amplitude tracking (amplitude sensor 19); interference detection (interference detector 20); and, Single side band processing (single sideband processor 21). The amplitude sensor provides a smoothed estimate for the signal amplitude R. The amplitude tracker algorithm is:

$$\hat{A}_{i+1} = \hat{A}_i + K(R_o \hat{A}_i) \quad (1)$$

where $\hat{A}$ indicates a smoothed estimate of signal amplitude, and K is a constant of value less than one which controls the number of samples over which the amplitude signal is smoothed.

When a signal greater than +3 dB is present, amplitude sensor 19 provides a smoothed output considerably above the noise level of the signal. When such a strong signal exists and simultaneously, the coherence sensor 16 indicates little or no coherence, then an interference condition is present. The interference condition is detected by the interference detector, 20, and an S.S. B. enable signal is generated.

The enable signal disables coherent detection and enables single side band detection.

The SSB processer 21 translates the polar coordinates back to rectancular coordinates and then recursively filters the X, Y samples.

The coordinate transformation is:

$$X_S = R \cos \phi_E \quad (2)$$

$$Y_S = R \sin \phi_E \quad (3)$$

The complex $X_S$, $Y_S$ samples are recursively filtered to attenuate the lower side band data. The output of the SB processor is the linear combination of the upper side band modulation of the two interfering signals, with a small percentage of lower side band power. Since voice and some other forms of data modulations, including tones, are insensitive to the absolute signal phase, and will tolerate small frequency shifts, the data is acceptable for the ear or for a down stream processor.

Figure 2:
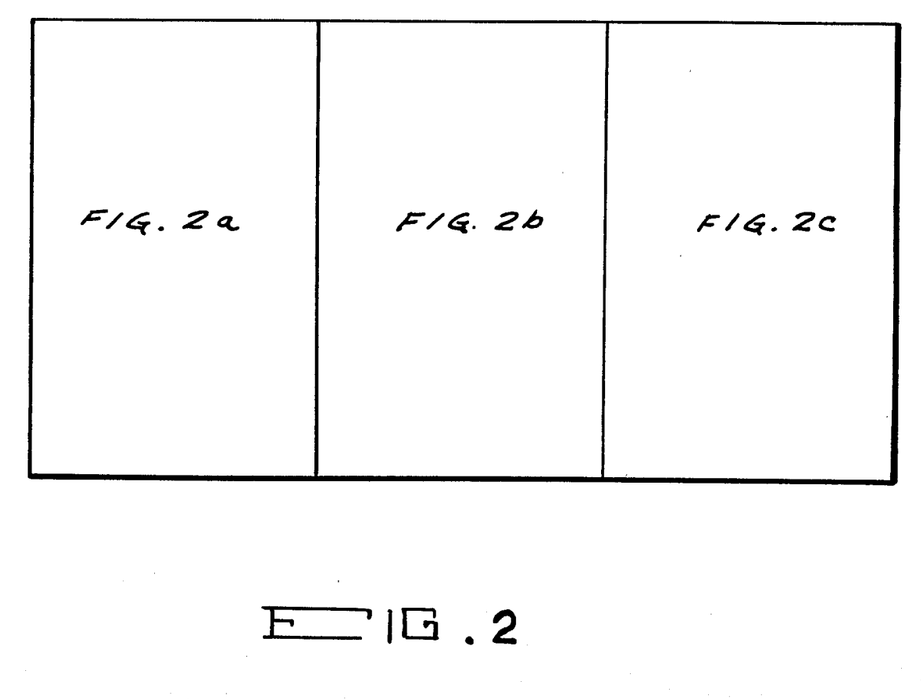
FIG. 2, comprised of FIGS. 2a, 2b, and 2c is a detailed schematic diagram of the adaptive doppler tracker of FIG. 1.
Figure 2A:
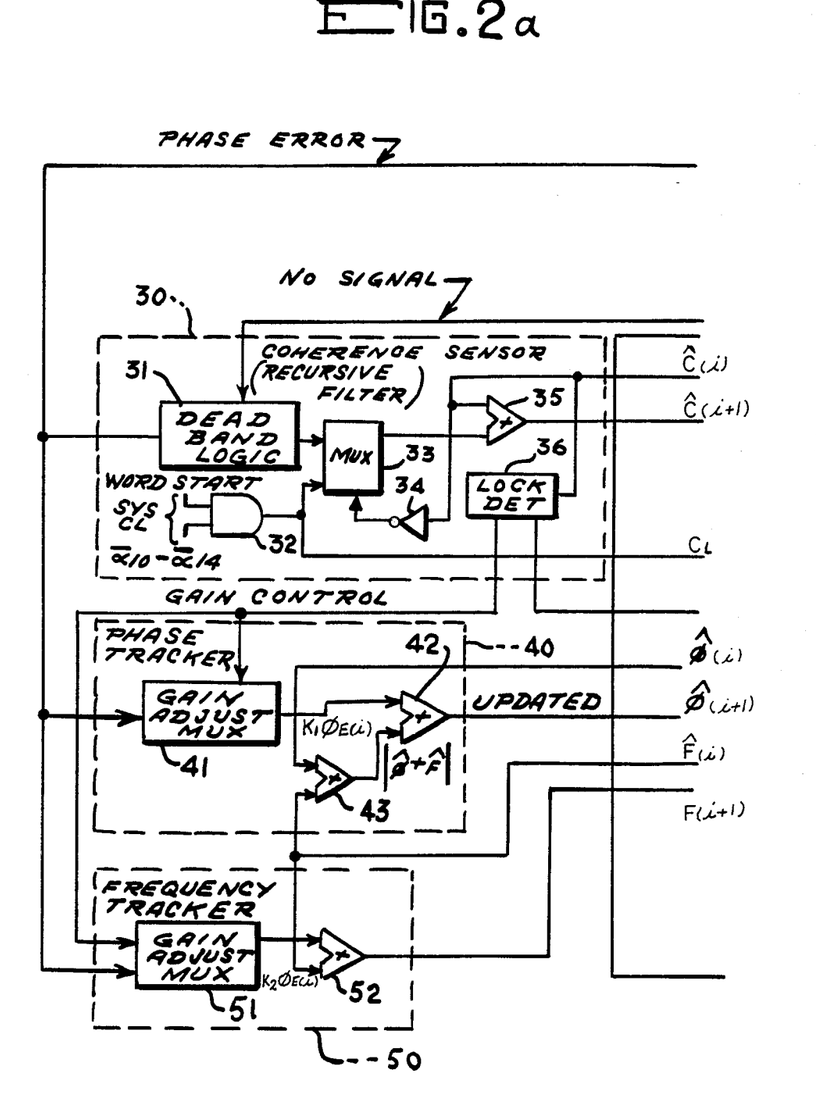
Figure 2B:
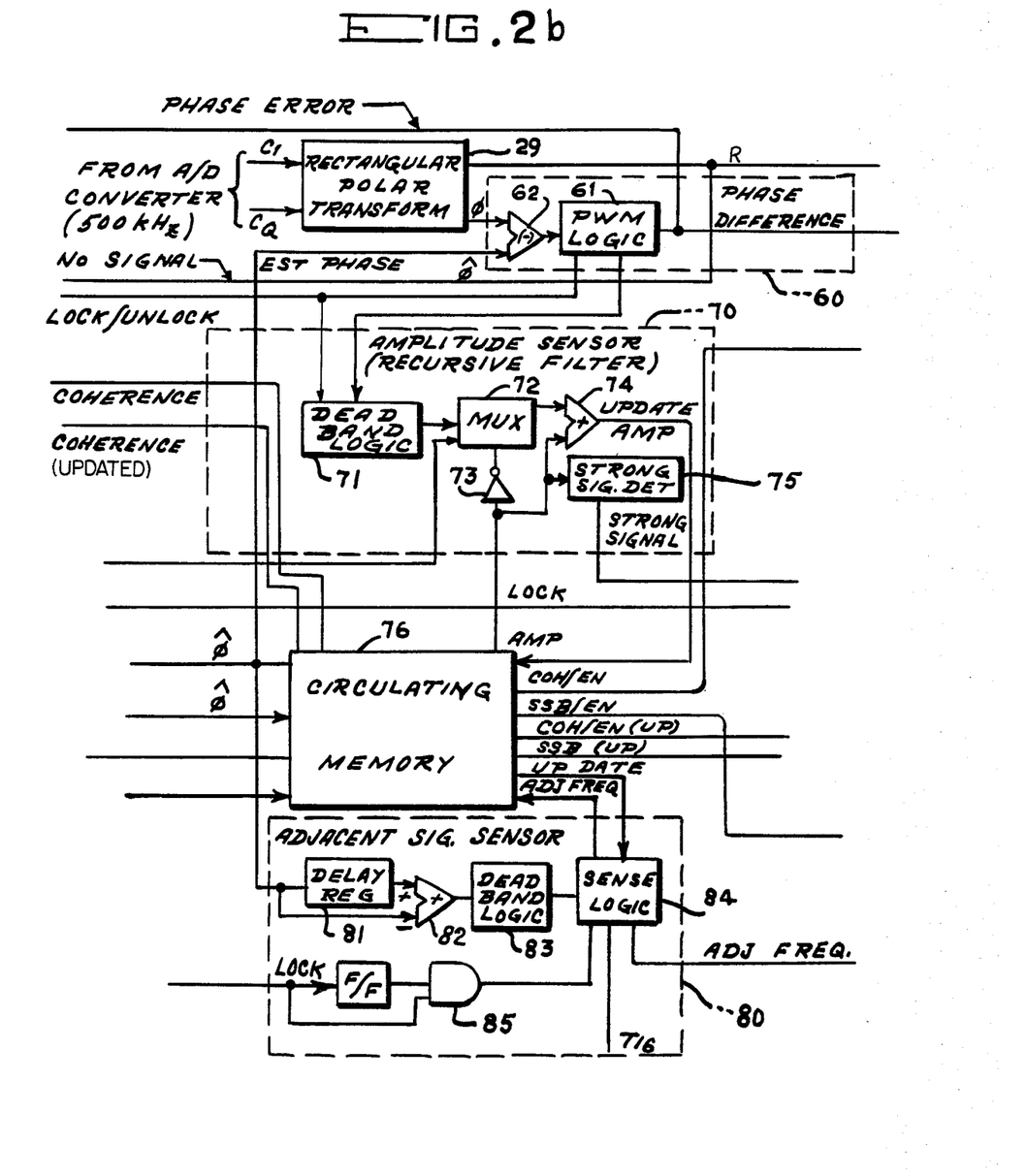
Figure 2C:
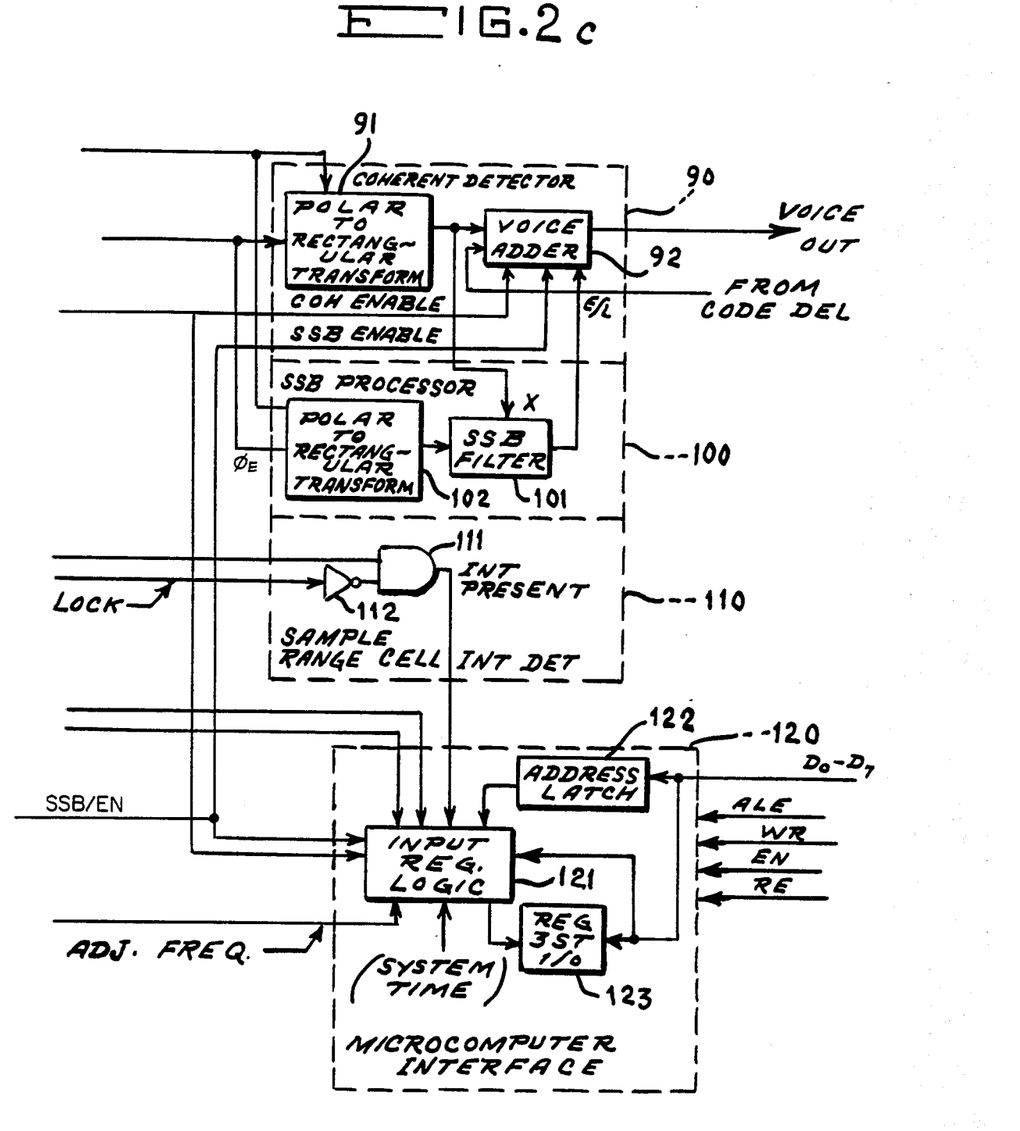

FIG. 2 comprised of FIGS. 2a, 2b, and 2c constitutes a first level diagram of an adaptive digital doppler tracker incorporating the interference detection circuits and the sample data phase locked loop of the invention. Referring thereto, the coordinate conversion function is provided by rectangular to polar transform means 29, which can be, for example a 4096×12 ROM. The function of subtractor 18 (FIG. 1) is provided by phase difference circuit 60 which comprises differencing amplifier means 62 and logic circuit 61. The coherence sensor function is implemented by the coherence sensors (recursive filter) 30 and comprises dead band logic circuit 31, AND gate 32, multiplexer 33, inverter 34, summing amplifier means 35 and lock detector circuit 36. Phase tracker 40 comprised of gain adjust multiplexer 41 and summing amplifier means 42, 43 provides the phase estimate loop function while the frequency estimate loop function is accomplished by frequency tracker 50 comprised of gain adjust multiplexer 51 and summing amplifier means 52. The data detection function is accomplished by coherent detector 90 comprised of polar to rectangular transformer and voice adder means 92. Interference detection and demodulation is accomplished by amplitude sensor 70 comprised of dead band logic 71, multiplexer 72, inverter 73, summing amplifier means 74 and strong signal detector 75; circulating memory means 76; interference detector 110 comprised of inverter 112 and AND gate 111; and single sideband (SSB) processor 100 comprised of polar to rectangular transform 102 and SSB filter 101. The SSB processor filtering is shown in detail in FIG. 3. The doppler tracker of FIG. 2 also includes adjacent signal detector 80 comprised of delay regulator 81, summing amplifier means 82, deadband logic 83, sense logic 84, flip flop 86 and AND gate 85; circuiating memory 76; and microcomputer interface 120 comprised of input logic 121, address latch 122 and I/O regulator 123.

In operation, the sample I and Q pulse inputs are converted from rectangular to polar coordinates in the 4096×12 bit ROM of rectangular to polar transform means 29. A phase estimate $\hat{\phi}$ is subtracted from the input by phase difference circuit 60 to obtain a phase error $\phi_E$. The phase error is used in the phase locked loop and in the coherence sensors 30, 70.

The phase error is used to compute coherence, using the digital recursive filter 36 as shown in FIG. 2. The coherence sensor works as follows: A phase angle error of between +30° and −30° (actually 5/16 of 90°) is called a +1. A phase angle difference greater than ±30° is called a −1. The recursive filter smoothes the one bit output over approximately 100 data samples (approximately 6 milliseconds). The output will remain negative if there is no coherence between the phase estimate and the phase input. Only when there is a pronounced coherence will the smoothed output exceed zero. This condition is used to sense phase lock acquisition, transition, track and unlock.

The phase tracker algorithms are:

$$\hat{\phi}_{(i+1)} = \phi_{E(i)} \cdot K_1 + \hat{\phi} + \hat{F}_i$$

$$\hat{F}_{(i+1)} = \phi_{E(i)} \cdot K_2 + \hat{F}_{(i)}$$

where the subscript i identifies the particular sampled pulse being processed, and $\hat{F}$ is the phase precession during the recursive interval. The coherence sensor provides the following function:

$$\hat{C}_{(i+1)} = \hat{C}_{(i)} - F(\phi_E)$$

where $\hat{C}$ is the absolute value of the phase error $\phi_E$ averaged over a plurality of recursive intervals.

The values of $K_1$ and $K_2$ are varied according to measured coherence of the signal. For low coherence, the values of K are large so that the acquisition bandwidths are large. As coherence increases, the gains are reduced, thereby reducing the bandwidths.

The amplitude sensor 70 is similar to the coherence sensor. The deadband logic preceding the recursive filter assigns amplitude below ±/3 dB, a −1 and above +3 dB a +1. The smoothed value will only exceed zero if the signal is greater than +3 dB. A signal output indicates the presence of a strong signal.

The strong signal detector 75 and the lock/unlock condition from the coherence sensor 30 are used to determine the presence of two signals in the same range bin or time slot, (same range cell interference detector 110). When this happens, the noncoherent power may be well above +3 dB, but the coherence will be negative. This combination uses the single sideband detector.

Figure 3:
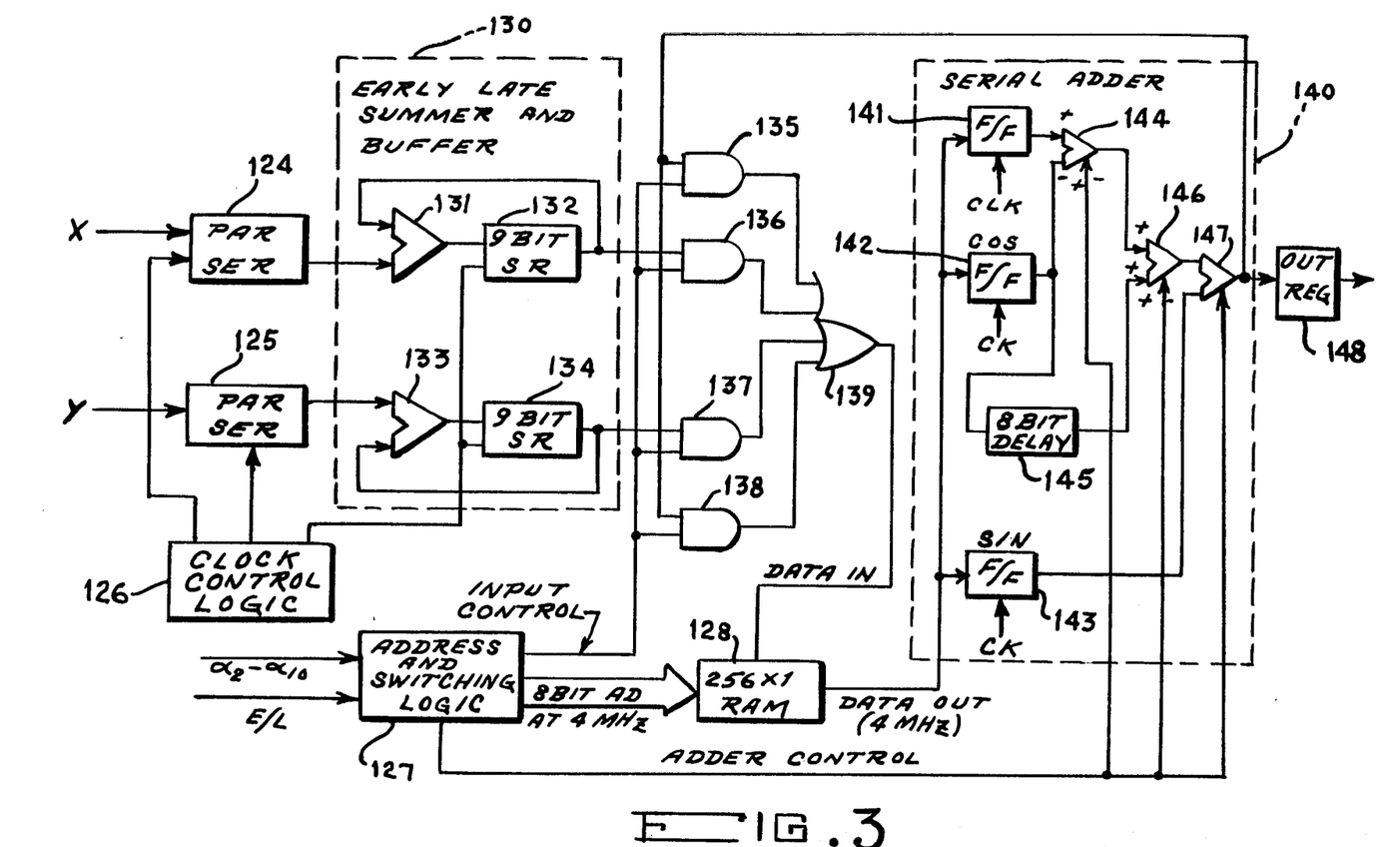
FIG. 3 is a schematic diagram of the single sideband processor of the adaptive doppler tracker of FIG. 1.

The single sideband processor 100 is shown in detail by the schematic diagram of FIG. 3. It comprises clock control logic 126, parallel to serial data components 124,125, an early/late summer and buffer 130 comprised of amplifiers 131, 133 and registers 132, 134, AND gates 135–138, NAND gate 139, address and switching logic 127, RAM 128, serial adders 140 comprised of flip flops 141–143, 8 bit delay 145, and amplifiers 144, 146, 147, and output register 148. The amplitude and phase error of the signals are coverted from rectangular to polar coordinates by ROM memories (4096×8). The X component of the sample is supplied by a ROM in the coherent sensor. The Y component of the sample is supplied by a ROM in the SSB processor.

The X, Y sampled outputs contain all of the data information and doppler information. The complex frequency has been shifted by the frequency tracker 50 which is forced into the narrow band phase lock loop mode even though the coherence is low. Thus, the estimated frequency changes very slowly (due to low loop gain) so that no SSB voice modulation is introduced by the tracker. It is preferable to use the polar coordinate signals (R, $\phi_E$) to generate X, Y than to use the $C_I$ and $C_Q$ values directly from the A/D converter. The reason is the X, Y signals have been shifted by the doppler tracker, and if a signal was being tracked, the doppler shift is compensated.

The SSB processor 100 processes one complex sample every 62.5 microseconds. Processing at this low rate can be done serially as shown in FIG. 3. This arrangement provides for a reduction in hardware.

The SSB processor shown in the figure is designed to process a voice sample which is obtained by coherently summing two consecutive pulses (an early pulse and a late pulse). The coherent sum represents a single sample at an 8 KHz data rate (125 microseconds).

The early/late samples are summed, converted to a serial output, and stored in the 256×1 bit RAM 128 as shown in FIG. 3. The 256×1 RAM contains sixteen-16 bit words.

In each 1 microsecond clock period, the RAM is read three times and written into once. The RAM cycle is 4 megahertz. The three readout samples are serial bits from a specified algorithm. The address provides the proper memory address as a function of the system time. The output is written into the RAM as one of the variables.

The adder 140 contains three serial adders and a delay register.

The serial implementation provides a three section complex filter, 16 bit words so that truncation is minimized, and minimum data pathes for LSI implementation.

Figure 4:
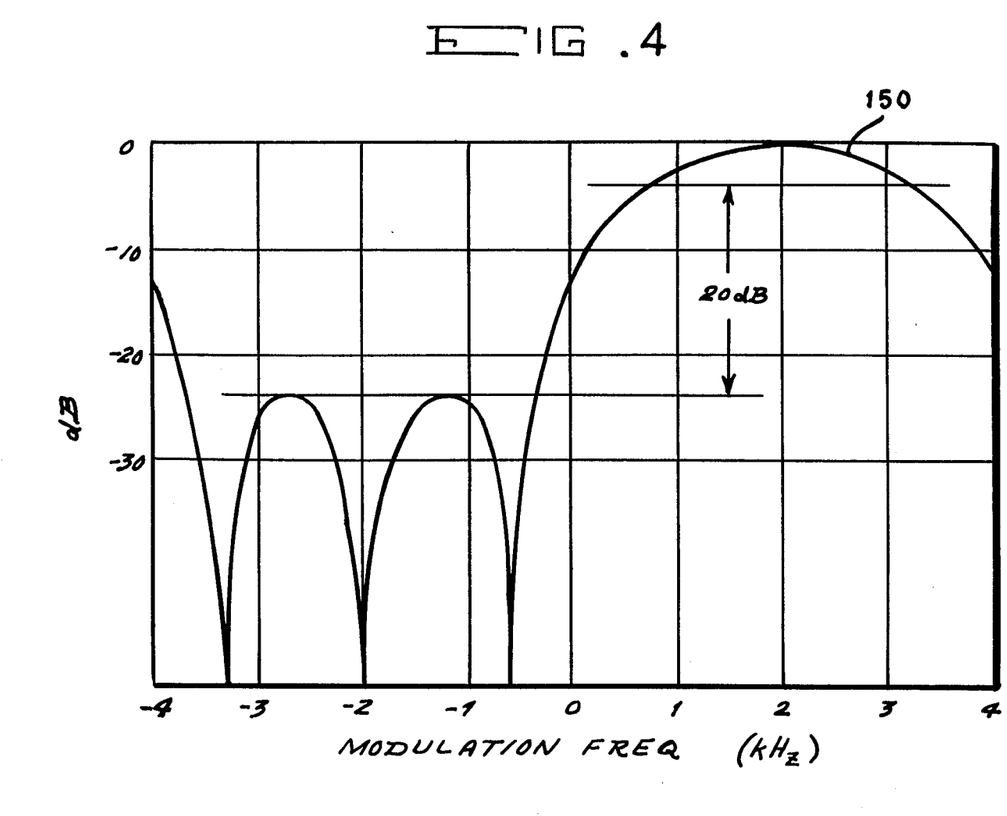
FIG. 4 is a graph showing the filter characteristics of the single sideband processor.

The filter characteristics are shown by curve 150 of FIG. 4. For signals between 0.5 and 3.5 KHz, the lower side band is 20 dB or more below the upper side band. This provides data detection with negligible distortion.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In a communications system, a digital adaptive doppler tracker, including a sample data phase locked loop and a circuit for detecting and demodulating interfering signals: said sample data phase locked loop comprising:

rectangular to polar coordinate conversion means receiving digitized bipolar X, Y in-phase and quadrature input signals and outputting polar digital signals R, $\bar{\phi}$, subtractor means subtracting a phase estimate signal $\hat{\phi}$ from said phase signal $\bar{\phi}$ to provide a phase error signal $\phi E$, a coherence sensor receiving said phase error signal $\phi_E$, and providing the coherence function $\hat{C}_{(i+1)} = \hat{C}_{(i)} - f(\phi_E)$, $f(\phi_E)$ being a function of phase estimate signal $\hat{\phi}$, said coherence sensor developing signals indicating coherence and non-coherence conditions and bandwidth control signals, a frequency estimate loop receiving said phase error signal $\phi_E$ and said bandwidth control signal and providing the frequency function $\hat{F}_{(i+1)} = \phi_{E(i)} \cdot K_2 + \hat{F}_{(i)}$, a phase estimate loop receiving said phase error signal $\phi E$, said bandwidth control signal and said frequency function and providing the phase function $\hat{\phi}_{(i+1)} = \phi_{E(i)} \cdot K_1 + \hat{\phi}_{(i)} + \hat{F}_{(i)}$, $K_1$ and $K_2$ being values selected as a function of coherence function C, and data detection means receiving polar digital signal R, phase estimate signal $\hat{\phi}$ and the phase function output of said phase estimate loop and providing an output $D_o = R \cos \phi_E$ therefrom; and, said circuit for detecting and demodulating interfering signals comprising, an amplitude sensor receiving polar amplitude signals R from said rectangular to polar coordinate conversion means and generating a strong signal output in response to interfering input signals, an SSB processor receiving said phase error signal and the outputs of said rectangular to polar coordinate conversion means, and an interference detector receiving said strong signal from said amplitude sensor and signals indicating coherence and non-coherence from said coherence sensor and generating an SSB enable signal in response to the coincidence of said strong signal and a non-coherence condition signal, said SSB enable signal being applied to enable said SSB processor and disable said data detection means.

2. A digital adaptive doppler tracker as defined in claim 1 including analog/digital converter means, said analog/digital converter means receiving analog signals from said communication system and outputting digitized bipolar X, Y in phase and quadrature signals to said rectangular to polar coordinate conversion means.

3. A digital adaptive doppler tracker as defined in claim 2 including a circulating memory means operatively connected to said coherence sensor, said amplitude sensor, said phase estimate loop, and said frequency estimate loop.

4. A digital adaptive doppler tracker as defined in claim 3 wherein said amplitude sensor comprises:

a dead band logic circuit receiving said polar amplitude signal R, an inverter receiving an input from said circulating memory means, a multiplexer receiving inputs from said dead band logic circuit, said inverter and said coherence sensor, a summing amplifier means having an input and an output receiving inputs from said multiplexers and said circulating memory means and feeding its output to said circulating memory means, and a strong signal detector having an input and an output receiving an input from said circulating memory means and feeding its output to said interference detector.

5. A digital adaptive doppler tracker as defined in claim 4 wherein said SSB processor comprises:

a polar to rectangular coordinate conversion means receiving the outputs of said rectangular to polar coordinate converter means, and an SSB filter receiving the output of said polar to rectangular coordinate conversion means and an SSB enable signal and providing an output in response thereto.

6. A digital adaptive doppler tracker as defined in claim 5 wherein said interference detector comprises:

an inverter receiving an input from said coherence sensor, and an AND gate receiving an input from said inverter and a strong signal from said amplitude sensor and outputting an SSB enable signal in response thereto.

7. A digital adaptive doppler tracker as defined in claim 6 including a sample pulse source, said sample pulse source providing repetitive samples at times T to said analog/digital converter, said rectangular to polar coordinates conversion means, and said phase estimate loop.

8. A digital adaptive doppler tracker as defined in claim 7 wherein said subtractor means comprises a subtractor amplifier means receiving polar digital phase signal $\phi$ and said estimated phase signal $\hat{\phi}$ and outputting said phase error signal $\phi_E$, and a logic circuit, said logic circuit receiving said phase error signal $\phi_E$ from said subtractor amplifier means and a polar amplitude signal from said rectangular to polar coordinate conversion means, said logic circuit outputting said phase error signal $\phi_E$ to said coherence sensor, said amplitude sensor, said frequency estimate loop and said phase estimate loop.

9. A digital adaptive doppler tracker as defined in claim 8 wherein said coherence sensor comprises a digital recursive filter.

10. A digital adaptive doppler tracker as defined in claim 9 wherein the values of $K_1$ and $K_2$ are varied in accordance with measured signal coherence.

11. A digital adaptive doppler tracker as defined in claim 10 wherein said coherence sensor comprises:

a dead band logic circuit receiving a polar amplitude signal from said rectangular to polar coordinate conversion means and a phase error signal $\phi_E$ from said subtractor means, an AND gate receiving system control signals, an inverter means receiving an output from said circulating memory means, multiplexer means receiving the outputs of said dead band logic circuit, said AND gate and said inverter means, a memory amplifier means having an input and an output receiving outputs from said multiplexer means and said circulating memory means and feeding its output to said circulating memory means, and a lock detector circuit receiving an output of said circulating memory means and providing a gain control signal to said phase estimate loop and said frequency estimate loop.

12. A digital adaptive doppler tracker as defined in claim 11 wherein said phase estimate loop comprises:

a gain adjust multiplexer receiving said gain control signal and said phase error signal $\phi_E$, a first summing amplifier receiving an input from said circulating memory means and an input from said frequency estimate loop, and a second summing amplifier having an input and an output receiving an input from said gain adjust multiplexer and an input from the output of said first summing amplifier and feeding its output to said circulating memory means.

13. A digital adaptive doppler tracker as defined in claim 12 wherein said frequency estimate loop comprises:

a gain adjust multiplexer receiving said gain control signal and said phase error signal, and a summing amplifier having an input and an output receiving the output of said gain adjust multiplexer and an output from said phase estimate loop and feeding its output to said circulation memory means.

14. A digital adaptive doppler tracker as defined in claim 13 wherein said data detector means comprises:

a polar to rectangular coordinate conversion means receiving the output of said subtractor means and a polar amplitude signal from said rectangluar to polar coordinate conversion means, and a voice adder circuit receiving outputs from said polar to rectangular coordinate conversion means and said circulating memory means and outputing the signal $D_o = R \cos \phi_E$.

* * * * *